(12) United States Patent
Kim

(10) Patent No.: US 12,137,485 B2
(45) Date of Patent: Nov. 5, 2024

(54) METHOD FOR TRANSMITTING/RECEIVING PDB-RELATED SIGNAL IN WIRELESS COMMUNICATION SYSTEM AND DEVICE THEREFOR

(71) Applicant: LG ELECTRONICS INC., Seoul (KR)

(72) Inventor: Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 561 days.

(21) Appl. No.: 17/309,837

(22) PCT Filed: Dec. 31, 2019

(86) PCT No.: PCT/KR2019/018804
§ 371 (c)(1),
(2) Date: Jun. 22, 2021

(87) PCT Pub. No.: WO2020/141859
PCT Pub. Date: Jul. 9, 2020

(65) Prior Publication Data
US 2022/0078857 A1 Mar. 10, 2022

(30) Foreign Application Priority Data
Dec. 31, 2018 (KR) .................. 10-2018-0173962

(51) Int. Cl.
*H04W 76/10* (2018.01)
*H04W 4/38* (2018.01)
(Continued)

(52) U.S. Cl.
CPC .............. *H04W 76/10* (2018.02); *H04W 4/38* (2018.02); *H04W 28/0268* (2013.01); *H04W 4/40* (2018.02)

(58) Field of Classification Search
CPC ... H04W 76/10; H04W 4/38; H04W 28/0268; H04W 4/40; H04W 4/70; H04W 28/02
See application file for complete search history.

(56) References Cited

U.S. PATENT DOCUMENTS

2019/0357301 A1* 11/2019 Li ..................... H04W 80/10
2021/0297893 A1* 9/2021 Hallenstål ............. H04W 80/04

FOREIGN PATENT DOCUMENTS

WO 2017142362 8/2017

OTHER PUBLICATIONS

SA WG2 Meeting #129 Bis (S2-1812089); Tittle: Solution for Key Issue #6: Division of E2E PDB (Year: 2018).*

(Continued)

*Primary Examiner* — Marisol Figueroa
(74) *Attorney, Agent, or Firm* — LEE, HONG, DEGERMAN, KANG & WAIMEY

(57) ABSTRACT

One embodiment relates to a method for a Session Management Function (SMF) transmitting/receiving a signal in a wireless communication system, the method comprising the steps in which: a SMF receives information associated with a non-accepted GBR QoS Flow; and the SMF transmits, to a target Next Generation-Radio Access Network (NG-RAN), request information associated with the applying of QoS Notification Control (QNC) to the non-accepted GBR QoS Flow.

11 Claims, 22 Drawing Sheets

(51) Int. Cl.
    *H04W 4/40*     (2018.01)
    *H04W 28/02*     (2009.01)

(56) References Cited

OTHER PUBLICATIONS

PCT International Application No. PCT/KR2019/018804, International Search Report dated Apr. 17, 2020, 15 pages.
Oppo, "Solution for KI#6 division of E2E PDB," S2-1811772, SA WG2 Meeting #129bis, Nov. 2018, 5 pages.
Huawei et al., "Solution for Key Issue #6: Division of E2E PDB," S2-1812089, SA WG2 Meeting #129bis, Nov. 2018, 5 pages.
Catt, "Clarify for PDB of dynamically assigned 5QI," S2-1812182, 3GPP TSG-SA2 Meeting #129-Bis, Nov. 2018, 6 pages.
Huawei et al., "New key issue and solution for the enhancement of PDB provision," S2-189055, SA WG2 Meeting #128Bis, Aug. 2018, 4 pages.

\* cited by examiner

METHOD FOR TRANSMITTING/RECEIVING PDB-RELATED SIGNAL IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2019/018804, filed on Dec. 31, 2019, which claims the benefit of earlier filing date and right of priority to Korean Application No. 10-2018-0173962, filed on Dec. 31, 2018, the contents of which is hereby incorporated by reference herein in its entirety.

TECHNICAL FIELD

The following description relates to a wireless communication system, and more particularly, to a method and device for transmitting/receiving a packet delay budget (PDB)-related signal.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Wireless communication systems adopt various radio access technologies (RATs) such as long term evolution (LTE), LTE-advanced (LTE-A), and wireless fidelity (WiFi). 5th generation (5G) is one of them. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, and media and entertainment applications in the cloud or augmented reality (AR). Data is one of the key drivers for 5G and in the 5G era, we may see no dedicated voice service for the first time. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in greater detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

DISCLOSURE

Technical Problem

Proposed herein are various methods related to PDB-related signal transmission/reception, a first delay value between NG-RAN and UPF, and a second delay value between UE and NG-RAN.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method for transmitting and receiving a signal by a next generation-radio access network (NG-RAN) in a wireless communication system may include receiving, by the NG-RAN, information related to at least one UPF, and based on a value of a first delay between the NG-RAN and the UPF, determining, by the NG-RAN, a value of a second delay between a UE and the NG-RAN, wherein the value of the first delay may be configured individually for the each UPF.

In another aspect of the present disclosure, a next generation-radio access network (NG-RAN) device in a wireless communication system may include at least one processor, and at least one memory operably coupled to the at least one processor, wherein the at least one processor may be configured to receive information related to at least one UPF and determine, based on a value of a first delay between the NG-RAN and the UPF, a value of a second delay between a UE and the NG-RAN, wherein the value of the first delay may be configured individually for the each UPF.

The first delay may be individually configured for the each UPF based on an IP address of the UPF.

The value of the second delay may be obtained by subtracting the value of the first delay from a packet delay budget (PDB) of a QoS flow.

The each UPF may correspond to a UPF terminating N3.

The NG-RAN may perform an operation related to scheduling for the UE based on the value of the second delay.

The UPF-related information may be received from a session management function (SMF).

The UPF-related information may be received through one of a PDU session establishment procedure, a PDU session modification procedure, or a service request procedure.

The UPF-related information may be received from an AMF through a PDU session resource setup request transfer information element.

The value of the first delay and the value of the second delay may be upper limits allowing a specific packet to be delayed.

Advantageous Effects

According to the present disclosure, ultra-reliable low-latency communication (URLLC) be efficiently supported.

The effects obtainable in the present disclosure are not limited to the above-mentioned effects, and other effects not mentioned may be clearly understood by those of ordinary skill in the art from the following description.

DESCRIPTION OF DRAWINGS

The accompanying drawings, which are included to provide a further understanding of the disclosure, illustrate embodiments of the disclosure and together with the description serve to explain the principle of the disclosure. In the drawings.

BEST MODE

Figure 1:
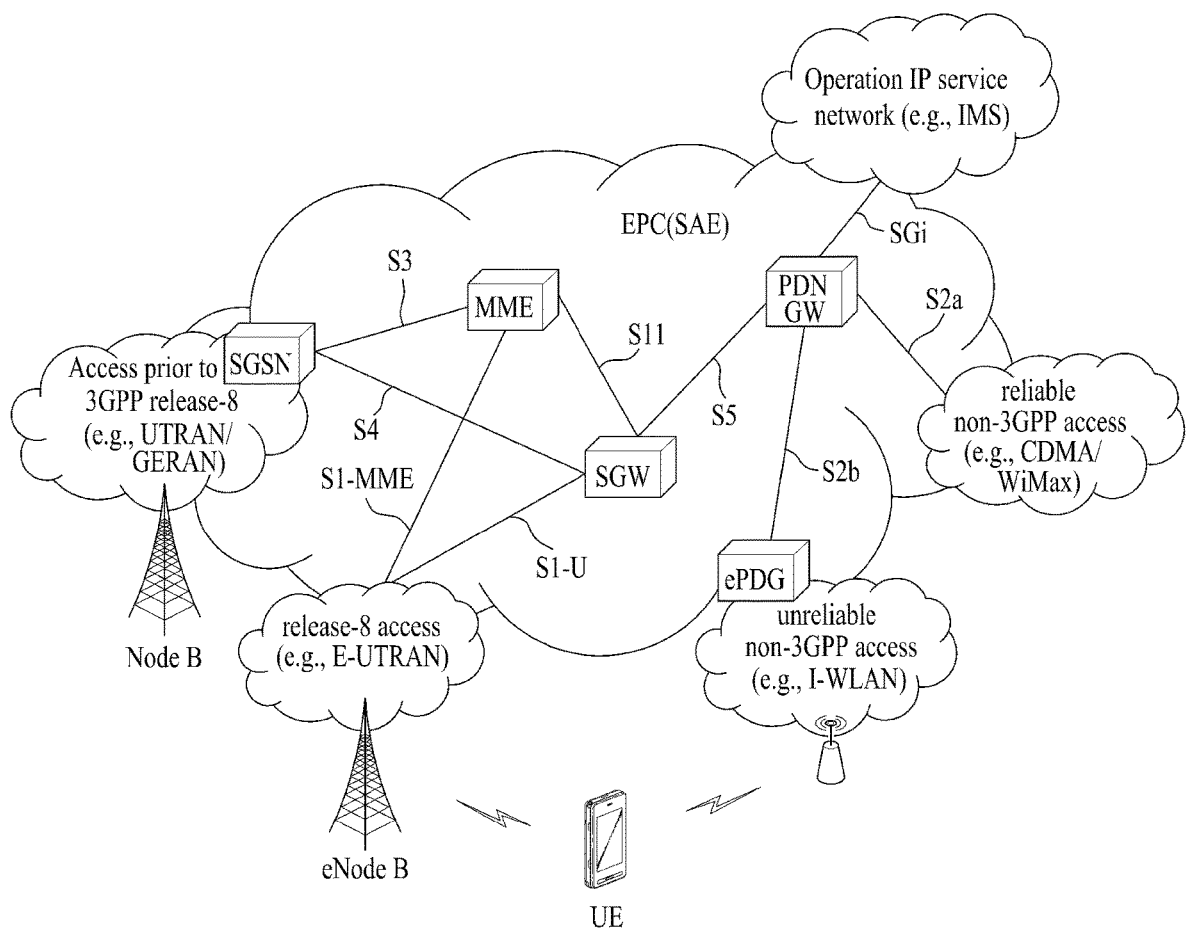
FIG. 1 is a schematic diagram illustrating the structure of an evolved packet system (EPS) including an evolved packet core (EPC)

The embodiments below are combinations of components and features of the present disclosure in a prescribed form. Each component or feature may be considered as selective unless explicitly mentioned as otherwise. Each component or feature may be executed in a form that is not combined with other components and features. Further, some components and/or features may be combined to configure an embodiment of the present disclosure. The order of operations described in the embodiments of the present disclosure may be changed. Some components or features of an embodiment may be included in another embodiment or may be substituted with a corresponding component or feature of the present disclosure.

Specific terms used in the description below are provided to help an understanding of the present disclosure, and the use of such specific terms may be changed to another form within the scope of the technical concept of the present disclosure.

In some cases, in order to avoid obscurity of the concept of the present disclosure, a known structure and apparatus may be omitted, or a block diagram centering on core functions of each structure or apparatus may be used. Moreover, the same reference numerals are used for the same components throughout the present specification.

The embodiments of the present disclosure may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present disclosure in the embodiments of the present disclosure may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present disclosure is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |

TABLE 1-continued

| Reference point | Description |
|---|---|
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
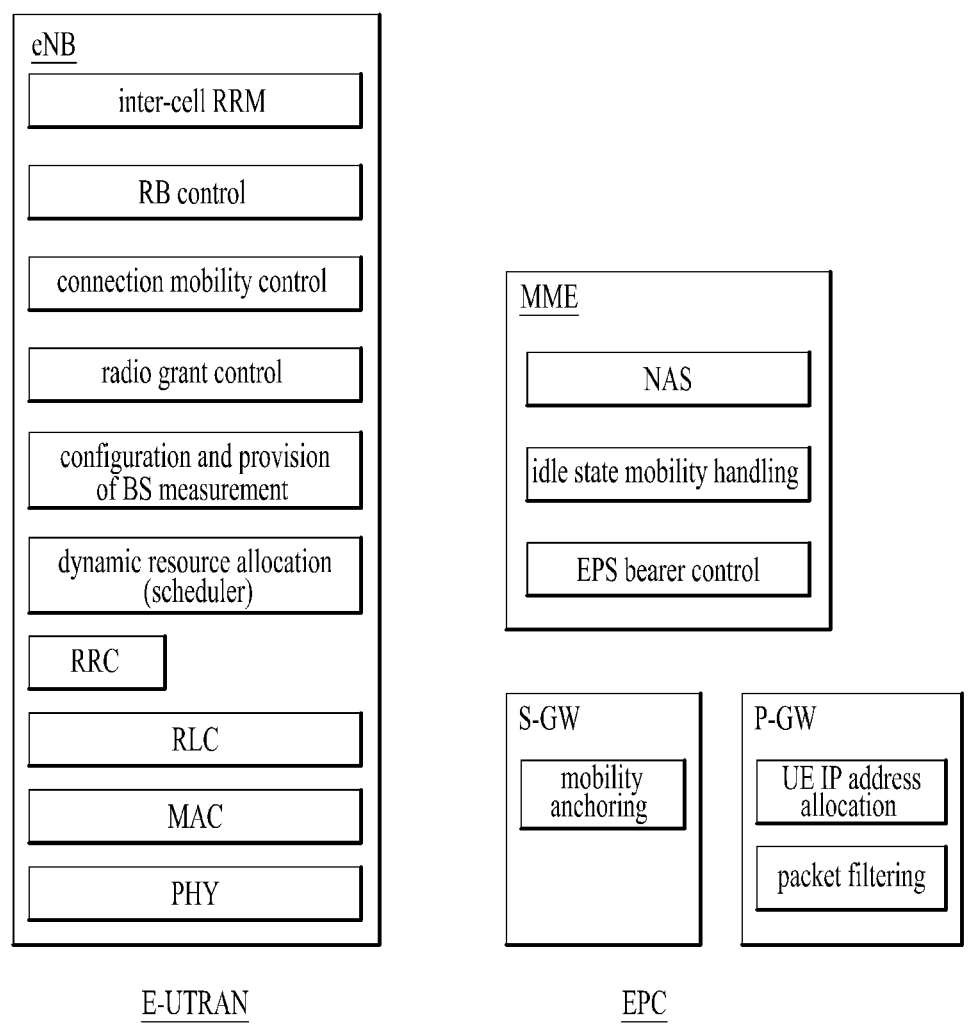
FIG. 2 is a diagram illustrating the general architectures of an E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
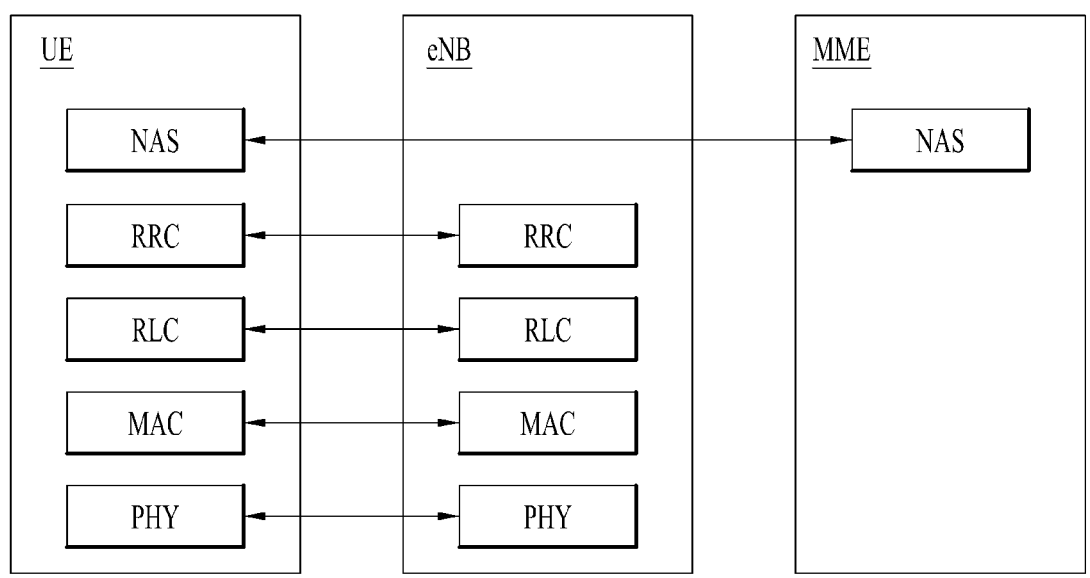
FIG. 3 is a diagram illustrating the structure of a radio interface protocol in a control plane.
Figure 4:
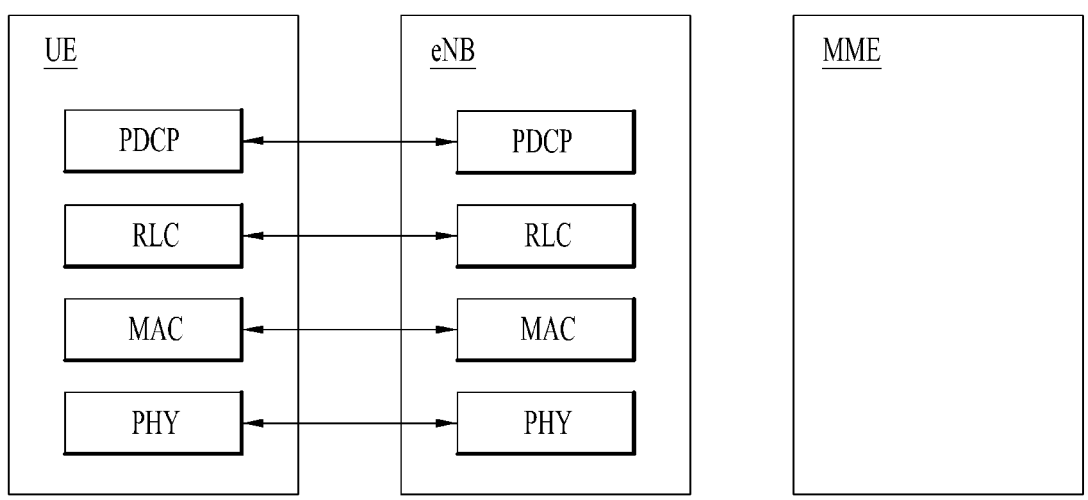
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPV4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one identifier (ID). This ID is called an EPS bearer ID. One EPS bearer has QoS characteristics of a maximum bit rate (MBR) and/or a guaranteed bit rate (GBR).

Figure 5:
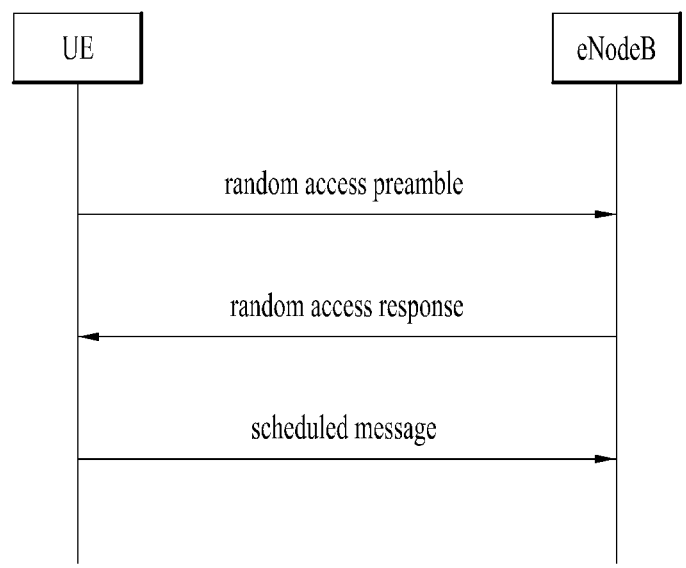
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB.

The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
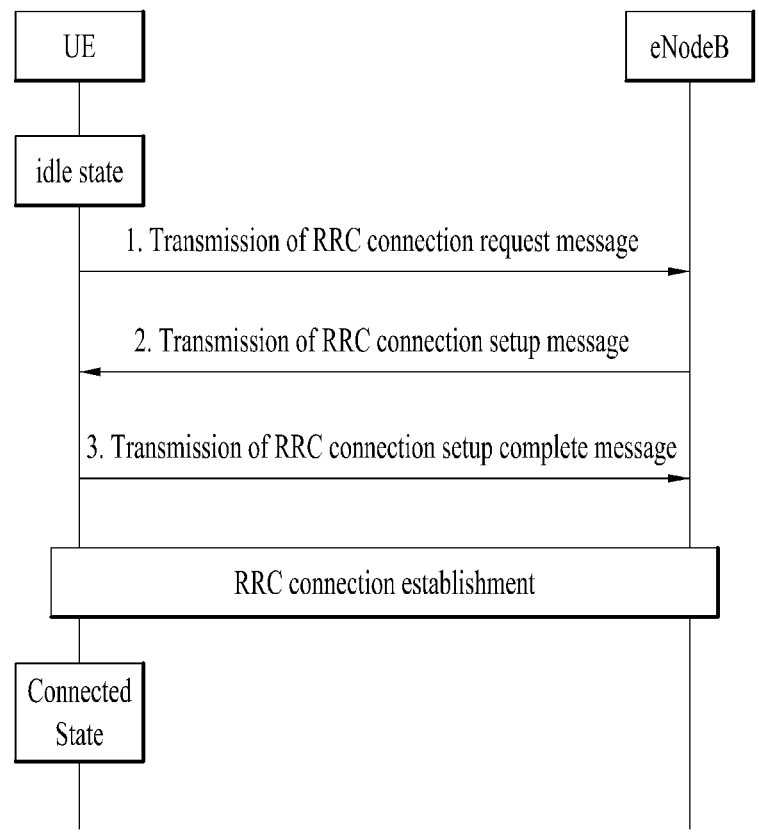
FIG. 6 is a diagram illustrating a connection process in a radio resource control (RRC) layer.

FIG. 6 illustrates a connection procedure in a radio resource control (RRC) layer.

As shown in FIG. 6, the RRC state is configured according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
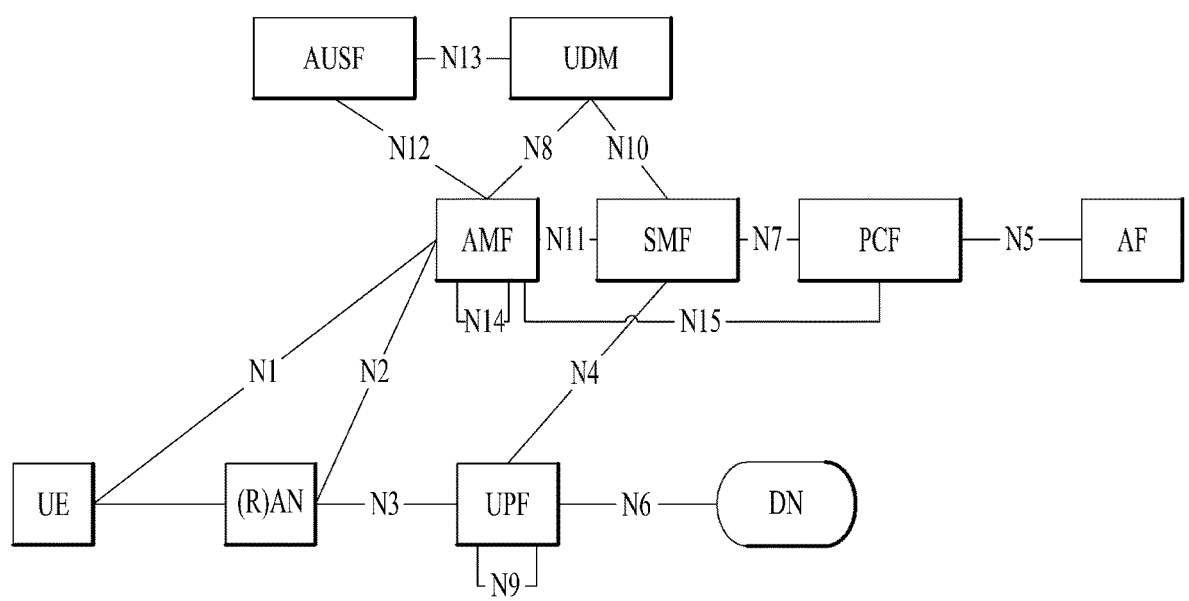
FIG. 7 is a diagram illustrating a 5th generation (5G) system.

The functionality of the MME in the legacy EPC is decomposed into the access and mobility management function (AMF) and the session management function (SMF) in the next generation system (or 5G core network (CN)). The AMF carries out NAS interaction with a UE and mobility management (MM), whereas the SMF carries out session management (SM). The SMF also manages a gateway, user plane function (UPF), which has the user-plane functionality, that is, routes user traffic. It may be considered that the SMF and the UPF implement the control-plane part and user-plane part of the S-GW and the P-GW of the legacy EPC, respectively. To route user traffic, one or more UPFs may exist between a RAN and a data network (DN). That is, for 5G implementation, the legacy EPC may have the configuration illustrated in FIG. 7. In the 5G system, a protocol data unit (PDU) session has been defined as a counterpart to a PDN connection of the legacy EPS. A PDU session refers to association between a UE and a DN, which provides a PDU connectivity service of an Ethernet type or an unstructured type as well as an IP type. The unified data management (UDM) performs the same functionality as the HSS of the EPC, and the policy control function (PCF) performs the same functionality as the policy and charging rules function (PCRF) of the EPC. Obviously, the functionalities may be extended to satisfy the requirements of the 5G system. For details of the architecture, functions, and interfaces of a 5G system, TS 23.501 is conformed to.

The 5G system is being worked on in TS 23.501 and TS 23.502. Accordingly, the technical specifications are conformed to for the 5G system in the present disclosure. Further, TS 38.300 is conformed to for details of NG-RAN-related architecture and contents. As the 5G system also supports non-3GPP access, section 4.2.8 of TS 23.501 describes architecture and network elements for supporting non-3GPP access, and section 4.12 of TS 23.502 describes procedures for supporting non-3GPP access. A representative example of non-3GPP access is WLAN access, which may include both a trusted WLAN and an untrusted WLAN. The AMF of the 5G system performs registration management (RM) and connection management (CM) for non-3GPP access as well as 3GPP access. As such, the same AMF serves a UE for 3GPP access and non-3GPP access belonging to the same PLMN, so that one network function may integrally and efficiently support authentication, mobility management, and session management for UEs registered through two different accesses.

The Packet Delay Budget (PDB) defines an upper bound for the time that a packet may be delayed between the UE and the UPF that terminates the N6 interface. For a specific 5QI, the PDB value is the same in UL and DL. In the case of 3GPP access, the PDB is used to support the configuration of scheduling and link layer functions (e.g. the setting of scheduling priority weights and HARQ target operating points). For GBR QoS flows using the delay-critical resource type, a packet delayed more than the PDB is counted as lost if the data burst is not exceeding the MDBV within the period of PDB and the QoS flow is not exceeding the GFBR. For GBR QOS flows with GBR resource type, the PDB shall be interpreted as a maximum delay with a confidence level of 98% if the QoS flow is not exceeding the GFBR. When the SMF adds a QoS flow to NG-RAN or modifies the same, various kinds of information/parameters for the QoS flow may be provided. In this case, when standardized 5QI or pre-configured 5QI is allocated to the QoS flow, the NG-RAN may determine the same because PDB is already determined. When non-standardized 5QI or not pre-configured 5QI is allocated to the QoS flow, the NG-RAN may determine the same by providing a PDB. Table 2, which is excerpts of TS 23.501v15.4.0 and TS 23.501v15.4.0, shows other details of the PDB as the conventional technology for the present disclosure.

TABLE 2

| 5.7.3 5 G QoS characteristics |
|---|
| 5.7.3.1 General |

This clause specifies the 5 G QoS characteristics associated with 5QI. The characteristics describe the packet forwarding treatment that a QoS Flow receives edge-to-edge between the UE and the UPF in terms of the following performance characteristics:
1 Resource Type (GBR, Delay critical GBR or Non-GBR);
2 Priority Level;
3 Packet Delay Budget;
4 Packet Error Rate;
5 Averaging window (for GBR and Delay-critical GBR resource type only);
6 Maximum Data Burst Volume (for Delay-critical GBR resource type only).
The 5 G QoS characteristics should be understood as guidelines for setting node specific parameters for each QoS Flow e.g. for 3GPP radio access link layer protocol configurations. Standardized or pre-configured 5 G QOS characteristics, are indicated through the 5QI value, and are not signalled on any interface, unless certain 5 G QoS characteristics are modified as specified in clauses 5.7.3.3, 5.7.3.6, and 5.7.3.7.

TABLE 2-continued 5.7.3 5 G QoS characteristics

NOTE: As there are no default values specified, pre-configured 5 G QoS characteristics have to include all of the characteristics listed above.

Signalled 5 G QoS characteristics are provided as part of the QoS profile and shall include all of the characteristics listed above.

5.7.3.4 Packet Delay Budget

The Packet Delay Budget (PDB) defines an upper bound for the time that a packet may be delayed between the UE and the UPF that terminates the N6 interface. For a certain 5QI the value of the PDB is the same in UL and DL. In the case of 3GPP access, the PDB is used to support the configuration of scheduling and link layer functions (e.g. the setting of scheduling priority weights and HARQ target operating points). For GBR QoS Flows using the Delay-critical resource type, a packet delayed more than PDB is counted as lost if the data burst is not exceeding the MDBV within the period of PDB and the QoS Flow is not exceeding the GFBR. For GBR QoS Flows with GBR resource type, the PDB shall be interpreted as a maximum delay with a confidence level of 98 percent if the QoS flow is not exceeding the GFBR.
NOTE 1: The delay between the UPF terminating N6 and the 5G-AN has to be subtracted from a given PDB to derive the packet delay budget that applies to the radio interface. For a standardized 5QI, the delay between a UPF terminating N6 and a 5G-AN is specified in the QoS characteristics Table 5.7.4.1. For a non-standardized 5QI, the delay between a UPF terminating N6 and a 5G-AN is assumed to be consistently configured in the network.

Services using a GBR QoS Flow and sending at a rate smaller than or equal to the GFBR can in general assume that congestion related packet drops will not occur.
NOTE 2: Exceptions (e.g. transient link outages) can always occur in a radio access system which may then lead to congestion related packet drops. Packets surviving congestion related packet dropping may still be subject to non congestion related packet losses (see PER below).

Services using Non-GBR QoS Flows should be prepared to experience congestion-related packet drops and delays. In uncongested scenarios, 98 percent of the packets should not experience a delay exceeding the 5QI's PDB.
The PDB for Non-GBR and GBR resource types denotes a "soft upper bound" in the sense that an "expired" packet, e.g. a link layer SDU that has exceeded the PDB, does not need to be discarded and is not added to the PER. However, for a Delay critical GBR resource type, packets delayed more than the PDB are added to the PER and can be discarded or delivered depending on local decision.

Tables 3 and 4 relate to PDU session resource setup request transfer, extracted from TS 38.413 CR0003r2 in RP-182448 (RAN3 CRs to NR Access Technology—Set 3) that is to be reflected in TS 38.413v15.1.0, and shows information/parameters provided when adding a QoS flow to the NG-RAN.

TABLE 3

| IE/Group Name | Presence | Range | IE type and reference | Semantics description | Criticality | Assigned Criticality |
|---|---|---|---|---|---|---|
| PDU Session Aggregate Maximum Bit Rate | O | | 9.3.1.102 | This IE shall be present when at least one non-GBR QoS flow is being setup. | YES | reject |
| UL NG-U UP TNL Information | M | | UP Transport Layer Information 9.3.2.2 | UPF endpoint of the NG-U transport bearer, for delivery of UL PDUs. | YES | reject |
| Additional UL NG-U UP TNL Information | O | | UP Transport Layer Information 9.3.2.2 | UPF endpoint of the additional NG-U transport bearer, for delivery of UL PDUs. | YES | reject |
| Data Forwarding Not Possible | O | | 9.3.1.63 | This IE may be present in case of HANDOVER REQUEST message and shall be ignored otherwise. | YES | reject |

TABLE 3-continued

| IE/Group Name | Presence | Range | IE type and reference | Semantics description | Criticality | Assigned Criticality |
|---|---|---|---|---|---|---|
| PDU Session Type | M | | 9.3.1.52 | | YES | reject |
| Security Indication | O | | 9.3.1.27 | | YES | reject |
| Network Instance | O | | 9.3.1.113 | | YES | reject |
| QoS Flow Setup Request List | | 1 | | | YES | reject |
| >QoS Flow Setup Request Item | | 1 ... <max noofQoS Flows> | | | — | |
| >>QOS Flow Identifier | M | | 9.3.1.51 | | — | |
| >>QOS Flow Level QoS Parameters | M | | 9.3.1.12 | | — | |
| >>E-RAB ID | O | | 9.3.2.3 | | — | |

TABLE 4

| Range bound | Explanation |
|---|---|
| maxnoofQoSFlows | Maximum no. of QoS flows allowed within one PDU session. Value is 64. |

Table 5 below shows QoS flow level QoS parameters.

TABLE 5

| IE/Group Name | Presence | Range | IE type and reference | Semantics description |
|---|---|---|---|---|
| CHOICE QoS Characteristics | M | | | |
| >Non-dynamic 5QI | | | | |
| >>Non Dynamic 5QI Descriptor | M | | 9.3.1.28 | |
| >Dynamic 5QI | | | | |
| >>Dynamic 5QI Descriptor | M | | 9.3.1.18 | |
| Allocation and Retention Priority | M | | 9.3.1.19 | |
| GBR QoS Flow Information | O | | 9.3.1.10 | This IE shall be present for GBR QoS Flows only. |
| Reflective QoS Attribute | O | | ENUMERATED (subject to, ... ) | Details in TS 23.501 [9]. This IE may be present in case of non-GBR QoS flows and shall be ignored otherwise. |
| Additional QoS Flow Information | O | | ENUMERATED (more likely, ...) | This IE indicates that traffic for this QoS flow is likely to appear more often than traffic for other flows established for the PDU session. This IE may be present in case of non-GBR QoS flows and shall be ignored otherwise. |

Tables 6 to 7 show details related to the dynamic 5QI descriptor.

TABLE 6

| IE/Group Name | Presence | Range | IE type and reference | Semantics description |
|---|---|---|---|---|
| Priority Level | M | | 9.3.1.84 | Priority Level is specified in TS 23.501 [9]. |
| Packet Delay Budget | M | | 9.3.1.80 | Packet Delay Budget is specified in TS 23.501 [9]. |

TABLE 6-continued

| IE/Group Name | Presence | Range | IE type and reference | Semantics description |
|---|---|---|---|---|
| Packet Error Rate | M | | 9.3.1.81 | Packet Error Rate is specified in TS 23.501 [9]. |
| 5QI | O | | INTEGER (0 ... 255, ... ) | Indicates the dynamically assigned 5QI as specified in TS 23.501 [9]. |
| Delay Critical | C-ifGBRflow | | ENUMERATED (delay critical, non-delay critical, ... ) | Indicates whether the GBR QoS flow is delay critical as specified in TS 23.501 [9] |
| Averaging Window | C-ifGBRflow | | 9.3.1.82 | Averaging Window is specified in TS 23.501 [9]. |
| Maximum Data Burst Volume | O | | 9.3.1.83 | Maximum Data Burst Volume is specified in TS 23.501 [9]. This IE shall be included if the Delay Critical IE is set to "delay critical" and shall be ignored otherwise. |

TABLE 7

| Condition | Explanation |
|---|---|
| ifGBRflow | This IE shall be present if the GBR QoS Flow Information IE is present in the QoS Flow Level QoS Parameters IE. |

Table 8 shows the non dynamic 5QI descriptor.

TABLE 8

| IE/Group Name | Presence | Range | IE type and reference | Semantics description |
|---|---|---|---|---|
| 5QI | M | | INTEGER (0 ... 255, ... ) | Indicates the standardized or pre-configured 5QI as specified in TS 23.501 [9]. |
| Priority Level | O | | 9.3.1.84 | Priority Level is specified in TS 23.501 [9]. When included, it overrides standardized or pre-configured value. |
| Averaging Window | O | | 9.3.1.82 | This IE applies to GBR QoS flows only. Averaging Window is specified in TS 23.501 [9]. When included, it overrides standardized or pre-configured value. |
| Maximum Data Burst Volume | O | | 9.3.1.83 | Maximum Data Burst Volume is specified in TS 23.501 [9]. When included, it overrides standardized or pre-configured value. If the 5QI refers to a non delay critical QoS flow the IE shall be ignored. |

Tables 9 to 10 below are excerpts from TS 23.501v15.4.0 and show that PDB values are already determined for standardized 5QI.

TABLE 9

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 1 | GBR (NOTE 1) | 20 | 100 ms (NOTE 11, NOTE 13) | $10^{-2}$ | N/A | 2000 ms | Conversational Voice |

TABLE 9-continued

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 2 | | 40 | 150 ms (NOTE 11, NOTE 13) | $10^{-3}$ | N/A | 2000 ms | Conversational Video (Live Streaming) |
| 3 (NOTE 14) | | 30 | 50 ms (NOTE 11, NOTE 13) | $10^{-3}$ | N/A | 2000 ms | Real Time Gaming, V2X messages Electricity distribution - medium voltage, Process automation - monitoring |
| 4 | | 50 | 300 ms (NOTE 11, NOTE 13) | $10^{-6}$ | N/A | 2000 ms | Non-Conversational Video (Buffered Streaming) |
| 65 (NOTE 9, NOTE 12 | | 7 | 75 ms (NOTE 7, NOTE 8) | $10^{-2}$ | N/A | 2000 ms | Mission Critical user plane Push To Talk voice (e.g., MCPTT) |
| 66 (NOTE 12) | | 20 | 100 ms (NOTE 10, NOTE 13 | $10^{-2}$ | N/A | 2000 ms | Non-Mission-Critical user plane Push To Talk voice |
| 67 (NOTE 12) | | 15 | 100 ms (NOTE 10, NOTE 13) | $10^{-3}$ | N/A | 2000 ms | Mission Critical Video user plane |
| 75 (NOTE 14) | | | | | | | |
| 5 | Non-GBR (NOTE 1) | 10 | 100 ms NOTE 10, NOTE 13) | $10^{-6}$ | N/A | N/A | IMS Signalling |
| 6 | | 60 | 300 ms (NOTE 10, NOTE 13) | $10^{-6}$ | N/A | N/A | Video (Buffered Streaming) TCP-based (e.g., www, e-mail, chat, ftp, p2p file sharing, progressive video, etc.) |
| 7 | | 70 | 100 ms (NOTE 10, NOTE 13) | $10^{-3}$ | N/A | N/A | Voice, Video (Live Streaming) Interactive Gaming |
| 8 | | 80 | 300 ms (NOTE 13) | $10^{-6}$ | N/A | N/A | Video (Buffered Streaming) TCP-based (e.g., www, e-mail, chat, ftp, p2p file sharing, progressive video, etc.) |
| 9 | | 90 | | | | | |
| 69 (NOTE 9, NOTE 12) | | 5 | 60 ms (NOTE 7, NOTE 8) | $10^{-6}$ | N/A | N/A | Mission Critical delay sensitive signalling (e.g., MC-PTT signalling) |

TABLE 10

| | | | | | | | |
|---|---|---|---|---|---|---|---|
| 70 (NOTE 12) | Non-GBR (NOTE 1) | 55 | 200 ms (NOTE 7, NOTE 10) | $10^{-6}$ | N/A | N/A | Mission Critical Data (e.g. example services are the same as 5QI 6/8/9) |
| 79 | | 65 | 50 ms (NOTE 10, NOTE 13) | $10^{-2}$ | N/A | N/A | V2X messages |

TABLE 10-continued

| 80 | | 68 | 10 ms (NOTE 5, NOTE 10) | $10^{-6}$ | N/A | N/A | Low Latency eMBB applications Augmented Reality |
| 82 | Delay Critical GBR | 19 | 10 ms (NOTE 4) | $10^{-4}$ | 255 bytes | 2000 ms | Discrete Automation (see TS 22.261 [2]) |
| 83 | | 22 | 10 ms (NOTE 4) | $10^{-4}$ | 1354 bytes (NOTE 3) | 2000 ms | Discrete Automation (see TS 22.261 [2]) |
| 84 | | 24 | 30 ms (NOTE 6) | $10^{-5}$ | 1354 bytes (NOTE 3) | 2000 ms | Intelligent transport systems (see TS 22.261 [2]) |
| 85 | | 21 | 5 ms (NOTE 5) | $10^{-5}$ | 255 bytes | 2000 ms | Electricity Distribution- high voltage (see TS 22.261 [2]) |

NOTE 1:
A packet which is delayed more than PDB is not counted as lost, thus not included in the PER.
NOTE 2:
It is required that default MDBV is supported by a PLMN supporting the related 5QIs.
NOTE 3:
This MDBV value is set to 1354 bytes to avoid IP fragmentation for the IPV6 based, IPSec protected GTP tunnel to the 5G-AN node (the value is calculated as in Annex C of TS 23.060 [56] and further reduced by 4 bytes to allow for the usage of a GTP-U extension header).
NOTE 4:
A delay of 1 ms for the delay between a UPF terminating N6 and a 5G-AN should be subtracted from a given PDB to derive the packet delay budget that applies to the radio interface.
NOTE 5:
A delay of 2 ms for the delay between a UPF terminating N6 and a 5G-AN should be subtracted from a given PDB to derive the packet delay budget that applies to the radio interface.
NOTE 6:
A delay of 5 ms for the delay between a UPF terminating N6 and a 5G-AN should be subtracted from a given PDB to derive the packet delay budget that applies to the radio interface.
NOTE 7:
For Mission Critical services, it may be assumed that the UPF terminating N6 is located "close" to the 5G_AN (roughly 10 ms) and is not normally used in a long distance, home routed roaming situation. Hence delay of 10 ms for the delay between a UPF terminating N6 and a 5G_AN should be subtracted from this PDB to derive the packet delay budget that applies to the radio interface.
NOTE 8:
In both RRC Idle and RRC Connected mode, the PDB requirement for these 5QIs can be relaxed (but not to a value greater than 320 ms) for the first packet(s) in a downlink data or signalling burst in order to permit reasonable battery saving (DRX) techniques.
NOTE 9:
It is expected that 5QI-65 and 5QI-69 are used together to provide Mission Critical Push to Talk service (e.g., 5QI-5 is not used for signalling). It is expected that the amount of traffic per UE will be similar or less compared to the IMS signalling.
NOTE 10:
In both RRC Idle and RRC Connected mode, the PDB requirement for these 5QIs can be relaxed for the first packet(s) in a downlink data or signalling burst in order to permit battery saving (DRX) techniques.
NOTE 11:
In RRC Idle mode, the PDB requirement for these 5QIs can be relaxed for the first packet(s) in a downlink data or signalling burst in order to permit battery saving (DRX) techniques.
NOTE 12:
This 5QI value can only be assigned upon request from the network side. The UE and any application running on the UE is not allowed to request this 5QI value.
NOTE 13:
A delay of 20 ms for the delay between a UPF terminating N6 and a 5G-AN should be subtracted from a given PDB to derive the packet delay budget that applies to the radio interface.
NOTE 14:
This 5QI is not supported as it is only used for transmission of V2X messages over MBMS bearers as defined in TS 23.285 [72].

For details of the 5G system, refer to TS 23.501, TS 23.502, TS 23.503, TS 38.300, TS 38.413, TS 38.423, etc.

EMBODIMENT

Figure 8:
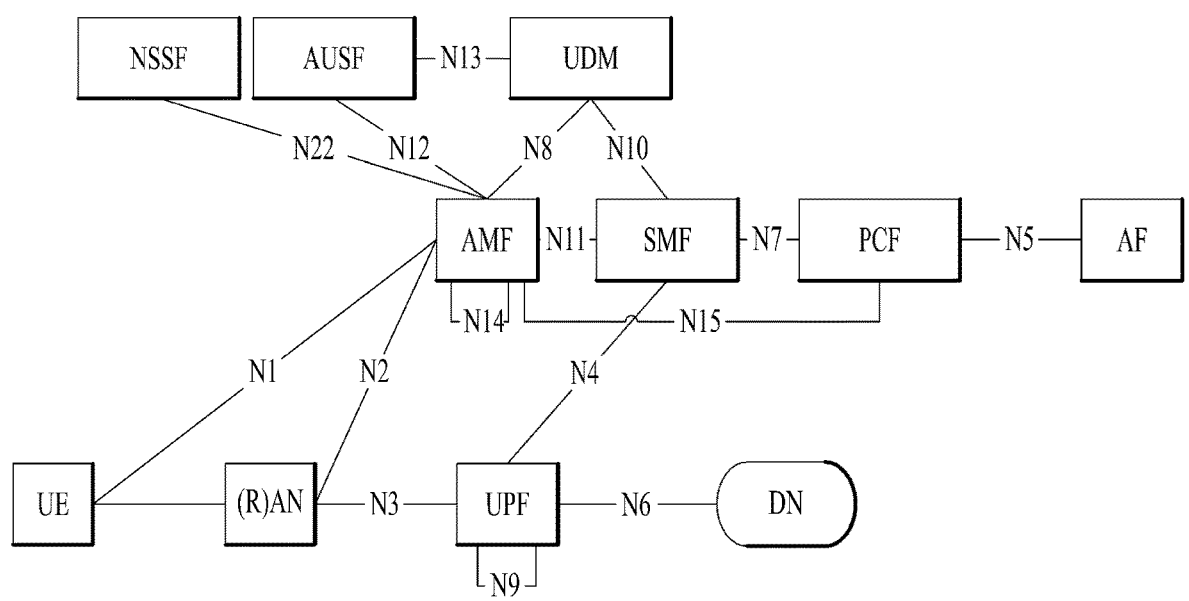
FIGS. 8 to 12 are diagrams illustrating the embodiment(s) of the present disclosure.

End-to-end PDB is the sum of an access network (AN) section delay and a CN (Core Network) section delay. In the 5G system of FIG. 8, the AN section delay is a delay between the UE and the (R)AN, and the CN section delay is a delay between the (R)AN and the UPF terminating the N6 interface (i.e., anchor UPF, PDU session anchor (PSA) UPF, UPF terminating N6, or N6 UPF). The N6 UPF may be the same as the UPF terminating the N3 interface (i.e., a UPF terminating N3 or N3 UPF) (In some cases, N6 UPF may be different from N3 UPF). In the following description, the PDB, delay and delay time may be used interchangeably. Although the following description is mainly based on the NG-RAN as an access network (AN), it is also applicable to other types of ANs (e.g., N3IWF).

Figure 9:
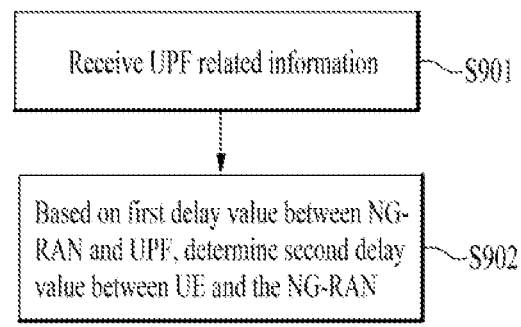
Figure 10:
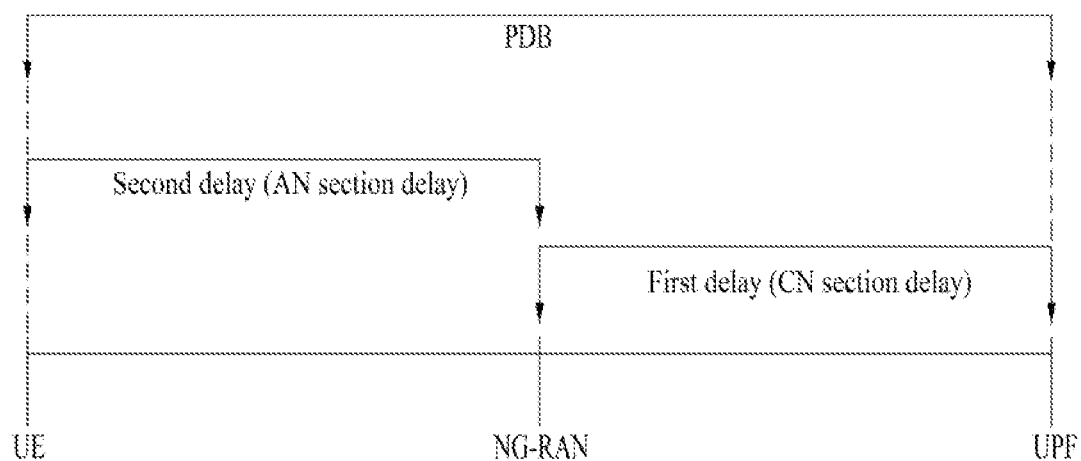

According to an embodiment, the NG-RAN may receive an UPF-related information (S901 in FIG. 9). Based on a first delay between the NG-RAN and the UPF, the NG-RAN may determine a second delay between the UE and the NG-RAN (S902 of FIG. 9). Specifically, referring to FIG. 10, the second delay may be a value obtained by subtracting the value of the first delay from the PDB.

Here, the first delay may be individually configured for each UPF. The N3 UPF may differ according to PDU session or QoS flow, and the first delay may be individually configured for each of the UPFs. More specifically, the first delay may be individually configured for each UPF based on the IP address of each UPF. Here, each UPF may correspond to a UPF terminating N3.

That is, the delay time between the NG-RAN and the N3 UPF may be configured/stored in the NG-RAN. The delay time may be configured/stored using the IP address used as an identifier by the N3 UPF. As mentioned above, the delay time between the NG-RAN and the N6 UPF is configured/stored in the NG-RAN because the N6 UPF may be the same as the N3 UPF. Here, the UPF may be a UPF terminating N6.

The NG-RAN may set/store delay times for all connected UPFs, that is, UPFs (N3 UPF or N6 UPF). The setting may be performed during network configuration/deployment, and also be updated in the middle. The setting may be performed when a new N3 UPF is connected to the NG-RAN, or a new NG-RAN is connected to the N3 UPF (using the OAM scheme or the like). In addition, as mentioned above, the delay time may be configured/stored using the IP address as an identifier used by the N3 UPF. Accordingly, when a PDU session is added or modified in the NG-RAN, or a QoS flow is added or modified, the delay time set/stored between the NG-RAN and the N3 UPF may be determined based on the IP address of the N3 UPF by obtaining N3 UPF-related information from the SMF. In order to add/modify a PDU session or add/modify a QoS flow in the NG-RAN, a PDU session establishment procedure, a PDU session modification procedure, and a service request procedure may be typically used. That is, the UPF-related information may be received through one of the PDU session establishment procedure, or the PDU session modification procedure, and the service request procedure. Alternatively, the UPF-related information may be received (from the SMF) when adding or changing a PDU session or QoS flow in the NG-RAN. The first delay and the second delay may be upper limits by which a specific packet may be delayed.

Figure 11:
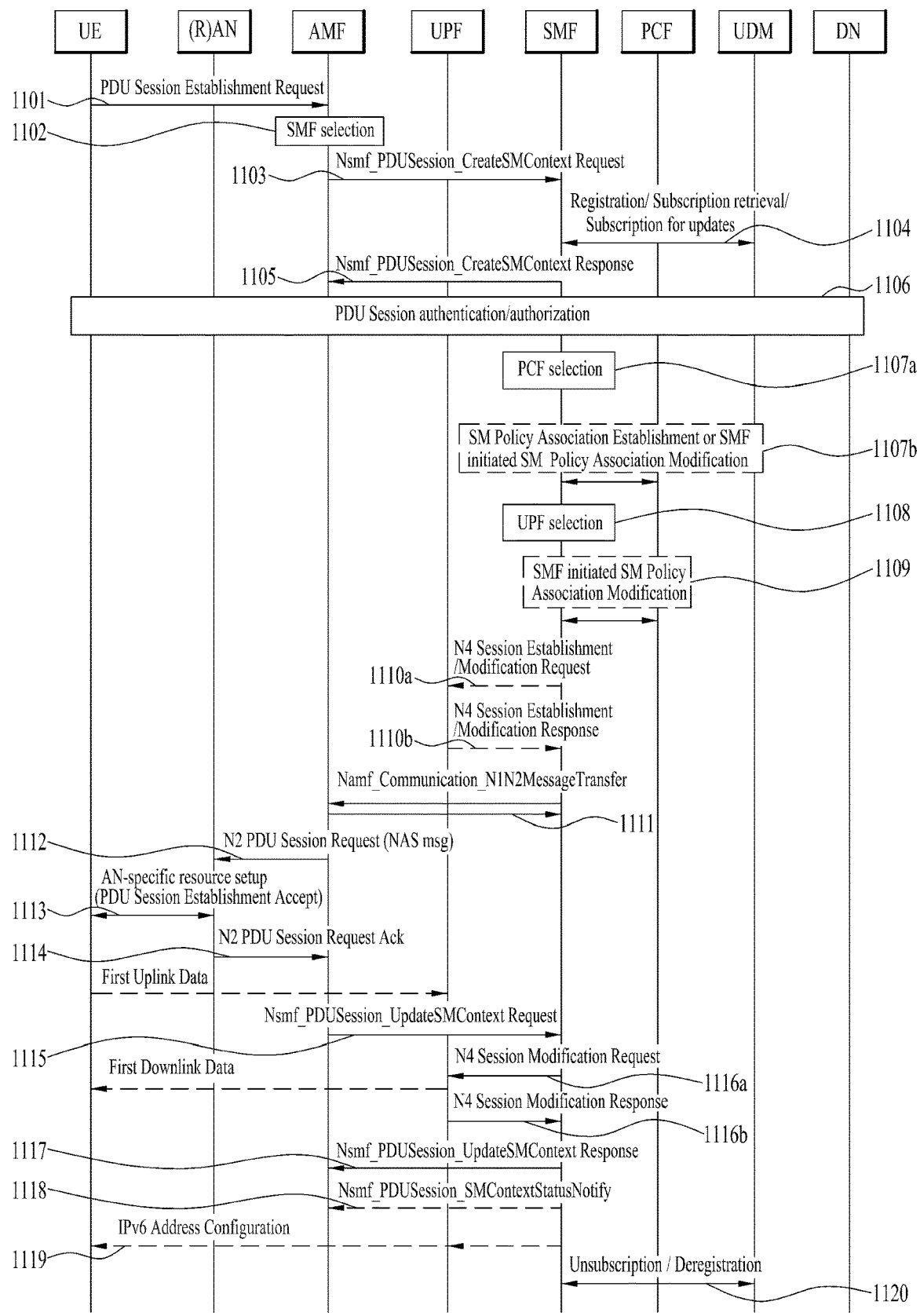

The UPF-related information may be received from the session management function (SMF). More specifically, referring to the PDU session establishment procedure of FIG. 11, in step 11, the SMF provides information related to creation of a PDU session to the NG-RAN. The information is transmitted as N2 SM information and includes an NGAP message called PDU Session Resource Setup Request Transfer. This message is delivered to NG-RAN through AMF. That is, the UPF-related information may be received from the AMF through the PDU Session resource setup request transfer information element.

The PDU session resource setup request transfer message may refer to Tables 3 and 4, and among the information elements (IEs) included in this message, UL NG-U UP TNL information has UP Transport layer information as an IE type and reference. This UP transport layer information includes an endpoint IP address as shown in Table 11 (an excerpt from TS 38.413 CR0003r2 in RP-182448 (RAN3 CRs to NR Access Technology—Set 3)).

TABLE 11

| IE/Group Name | Presence | Range | IE type and reference | Semantics description |
|---|---|---|---|---|
| CHOICE UP Transport Layer Information | M | | | |
| >GTP tunnel | | | | |
| >>Endpoint IP Address | M | | Transport Layer Address 9.3.2.4 | |
| >>GTP-TEID | M | | 9.3.2.5 | |

Accordingly, the NG-RAN may recognize the N3 UPF based on the endpoint IP address, and may calculate the end-to-end PDB using the delay time between the NG-RAN and the corresponding N3 UPF set/stored therein.

When the N3 UPF is changed for a certain PDU session or QoS flow, the NG-RAN should use a delay time with respect to a new N3 UPF. In setting the delay time with respect to the UPF connected to the NG-RAN in the NG-RAN, the delay time between the N3 UPF and N6 UPF sections may be considered to some degree. For example, when an actual delay time between the NG-RAN and a certain UPF is 0.8 ms, the delay time may be configured to 1 ms instead of 0.8 ms in consideration of the delay time between N3 UPF and N6 UPF as about 0.2 ms. Accordingly, the NG-RAN may be configured to always consider the delay time of the N3 UPF-N6 UPF section as 0 ms (refer to the description below).

Subsequently, the NG-RAN may perform an operation related to scheduling based on the second delay. When the delay of only the AN section is unknown, it is difficult to perform scheduling that meets the delay requirement for packets such as a URLLC packet. As described above, the first delay between the NG-RAN and the UPF may be individually configured for each UPF. A second delay, which is the AN section delay may be derived by subtracting the first delay from the end-to-end PDB, the given PDB, or the entire PDB. Based on the derived second delay, the NG-RAN may satisfy the delay requirement by appropriately scheduling the URLLC packet.

In addition, the SMF may perform the UPF selection based on the first delay set for each UPF. More specifically, in order to provide the URLLC service, data should be transmitted and received with low latency. To provide the URLLC service, a delay critical GBR QOS flow is mainly used. As seen from the 5QI values 82 to 85 in Table 9, the QoS flow requires a low-level PDB (5 ms to 30 ms). Accordingly, for the PDU session for the URLLC service, the N3 UPF that is near the NG-RAN or co-located with the NG-RAN should be selected. When an additional UPF (i.e., N9 UPF) is required between the N3 UPF and the data network, a UPF that is near the NG-RAN or localized should be selected. In other words, the operation may be interpreted as selecting UPF(s) that may satisfy the latency (i.e., delay) requirements for the URLLC service.

Figure 12:
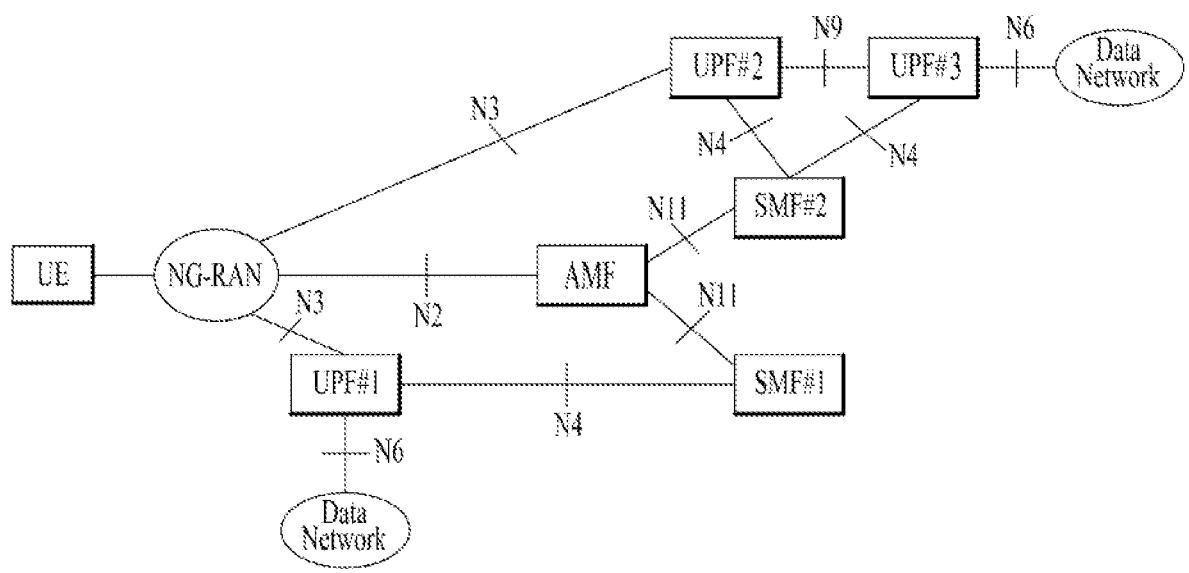

For example, when the SMF determines that this PDU session is for the URLLC service based on the S-NSSAI information and the DNN of the PDU session, it may select the N3 UPF that is near the NG-RAN or co-located with the NG-RAN as described above based on the UPF location information. FIG. 12 illustrates that UPF #1 is selected for the PDU session for the URLLC service (While FIG. 12 illustrates that N9 UPF is not present for this PDU session, N9 UPF may also be present, and a UPF that is near the NG-RAN or localized should be selected as the N9 UPF). In FIG. 12, UPF #2 and UPF #3 are UPFs selected for a PDU session for a service (e.g., an eMBB service such as a voice call) other than the URLLC service.

For other details related to UPF selection and reselection for a PDU session by the SMF, refer to Tables 12 and 13, which are excerpts from TS 23.501.

TABLE 12

| 6.3.3 User Plane Function Selection |
|---|
| 6.3.3.1 Overview |

The selection and reselection of the UPF are performed by the SMF by considering UPF deployment scenarios such as centrally located UPF and distributed UPF located close to or at the Access Network site. The selection of the UPF shall also enable deployment of UPF with different capabilities, e.g. UPFs supporting no or a subset of optional functionalities.
For home routed roaming case, the UPF(s) in home PLMN is selected by SMF(s) in HPLMN, and the UPF(s) in the VPLMN is selected by SMF(s) in VPLMN. The exact set of parameters used for the selection mechanism is deployment specific and controlled by the operator configuration.
The UPF selection involves:
a step of SMF Provisioning of available UPF(s). This step may take place while there is no PDU Session to establish and may be followed by N4 Node Level procedures defined in clause 4.4.3 of TS 23.502 [3] where the UPF and the SMF may exchange information such as the support of optional functionalities and capabilities.
A step of selection of an UPF for a particular PDU Session; it is followed by N4 session management procedures defined in clause 4.4.1 of TS 23.502 [3].

| 6.3.3.2 SMF Provisioning of available UPF(s) |
|---|

SMF may be locally configured with the information about the available UPFs, e.g. by OA&M system when UPF is instantiated or removed.
NOTE 1: UPF information can be updated e.g. by OA&M system any time after the initial provisioning, or UPF itself updates its information to the SMF any time after the node level interaction is established.

The UPF selection functionality in the SMF may optionally utilize the NRF to discover UPF instance(s). In this case, the SMF issues a request to the NRF that may include following parameters: DNN, S-NSSAI, SMF Area Identity, ATSSS steering capabilities. In its answer, the NRF provides the NF profile(s) that include(s) the IP address(es) or the FQDN of the N4 interface of corresponding UPF instance(s) to the SMF.
UPFs may be associated with an SMF Area Identity in the NRF. This allows limiting the SMF provisioning of UPF(s) using NRF to those UPF(s) associated with a certain SMF Area Identity. This can e.g. be used in the case that an SMF is only allowed to control UPF(s) configured in NRF as belonging to a certain SMF Area Identity.
The NRF may be configured by OAM with information on the available UPF(s) or the UPF instance(s) may register its/their NF profile(s) in the NRF. This is further defined in TS 23.502 [3] clause 4.17.

| 6.3.3.3 Selection of an UPF for a particular PDU Session |
|---|

If there is an existing PDU Session, and the SMF receives another PDU Session request to the same DNN and S-NSSAI, and if the SMF determines that interworking with EPC is supported for this PDU Session as specified in clause 4.11.5 of TS 23.502 [3], the SMF should select the same UPF, otherwise, if the SMF determines that interworking with EPC is not supported for the new PDU Session, a different UPF may be selected.
For the same DNN and S-NSSAI if different UPF are selected at 5GC, when the UE is moved to EPC network, there is no requirement to enforce APN-AMBR. Whether and how to apply APN-AMBR for the PDN Connection associated with this DNN/APN is implementation dependent, e.g. possibly only per PDU Session AMBR enforcement applies.
The following parameter(s) and information may be considered by the SMF for UPF selection and re-selection:
UPF's dynamic load.
Analytics (i.e. statistics or predictions) for UPF load as received from NWDAF (see TS 23.288 [86]), if NWDAF is deployed.
UPF's relative static capacity among UPFs supporting the same DNN.
UPF location available at the SMF.
UE location information.
Analytics (i.e. statistics or predictions) for UE's mobility as received from NWDAF (see TS 23.288 [86]), if NWDAF is deployed.

TABLE 12-continued

6.3.3 User Plane Function Selection

Capability of the UPF and the functionality required for the particular UE
session: An appropriate UPF can be selected by matching the functionality
and features required for an UE.
Data Network Name (DNN).
PDU Session Type (i.e. IPv4, IPV6, IPv4v6, Ethernet Type or Unstructured
Type) and if applicable, the static IP address/prefix.

SSC mode selected for the PDU Session.
UE subscription profile in UDM.
DNAI as included in the PCC Rules and described in clause 5.6.7.
Local operator policies.
S-NSSAI.
Access technology being used by the UE.
Information related to user plane topology and user plane terminations, that
may be deduced from:
5G-AN-provided identities (e.g. CellID, TAI), available UPF(s) and DNAI(s);
Identifiers (i.e. FQDN or IP address) of N3 terminations provided by a W-
AGF or a TNGF;
Information regarding the user plane interfaces of UPF(s). This information
may be acquired by the SMF using N4;
Information regarding the N3 User Plane termination(s) of the AN serving
the UE. This may be deduced from 5G-AN-provided identities (e.g. CellID,
TAI);
Information regarding the N9 User Plane termination(s) of UPF(s) if
needed;
Information regarding the User plane termination(s) corresponding to
DNAI(s).
RSN when redundant handling is applicable.
Information regarding the ATSSS Steering Capability of the UE session
(ATSSS-LL capability, MPTCP capability, or both).
Support for UPF allocation of IP address/prefix.
Support for High latency communication (see clause 5.31.8).
NOTE: How the SMF determines information about the user plane network topology
from information listed above, and what information is considered by the SMF,
is based on operator configuration.
A W-AGF or aTNGF may provide Identifiers of its N3 terminations when forwarding over
N2 uplink NAS signalling to the 5GC. The AMF may relay this information to the SMF, as
part of session management signalling for a new PDU Session.

Hereinafter, various methods by which the NG-RAN determines the delay time between N3 UPF and N6 UPF will be described.

As a first example, the SMF may provide a delay time between N3 UPF and N6 UPF. When a PDU session is added or modified in the NG-RAN, or when a QoS flow is added or modified, the SMF provides a delay time between N3 UPF and N6 UPF. The SMF may determine the delay time between the selected N3 UPF and the N6 UPF using configured information or by acquiring the same from another network node.

The information may be transmitted by adding a new information element (IE) to a message (represented expressed as N2 SM information or NGAP message) transmitted by the SMF to the NG-RAN. The delay time value may be expressed in decimal units (e.g., 0.5 ms). For example, a delay time between N3 UPF and N6 UPF is provided by adding a new IE (e.g., Inter UPF PDB or N9 PDB, etc.) to the PDU session resource setup request transfer message shown in Tables 3 to 4 above.

The SMF may provide the NG-RAN with the delay time between N3 UPF and N6 UPF when there is a change in the N3 UPF and N6 UPF sections even if there is no QoS flow added or modified. Where Changes occur in the N3 UPF and N6 UPF sections, for example, when N3 UPF is changed; N6 UPF is change; a UPF between N3 UPF and N6 UPF (this is also called N9 UPF or intermediate UPF) is added/changed/removed; or a combination of the aforementioned events occur.

As a second example, when the SMF does not provide a delay time between N3 UPF and N6 UPF, the delay time may be regarded as 0 ms. When a PDU session is added or modified in the NG-RAN, or a QoS flow is added or modified, the delay time is considered as 0 ms if the SMF does not provide a delay time between N3 UPF and N6 UPF.

As a third example, when a QoS flow is assigned to a specific 5QI, the delay time between N3 UPF and N6 UPF may be considered as 0 ms. When a QoS flow is added or modified in the NG-RAN and is assigned a specific 5QI value, the NG-RAN determines that the delay time between N3 UPF and N6 UPF is 0 ms.

The SMF provides QoS flow related information to the NG-RAN. According to the NGAP message, the information is included in the QoS flow Level QoS parameters. Referring to the QoS flow level QoS parameters described in Table 5, this IE includes a dynamic 5QI descriptor or a non dynamic 5QI descriptor, which includes a 5QI value allocated to the QoS flow. When this 5QI value is a specific value, the NG-RAN considers the delay time between N3 UPF and N6 UPF to be 0 ms. This specific 5QI value may be preset in the NG-RAN. For example, if the 5QI value assigned to/specified for the QoS flow is 82, 83, 84, or 85, the delay time between N3 UPF and N6 UPF is considered as 0 ms as described above.

As a fourth example, when the QoS flow is delay critical GBR, the delay time between N3 UPF and N6 UPF may be considered as 0 ms.

When a QoS flow is added or modified in the NG-RAN and the resource type of this QoS flow is delay critical GBR, the NG-RAN determines the delay time between N3 UPF and N6 UPF as 0 ms. When standardized 5QI or pre-configured 5QI is assigned to the QoS flow, it may be determined that the resource type of this QoS flow is delay critical GBR, based on the 5QI value (for example, in case of standardized 5QI, 82, 83, 84, or 85 (which is based on Release 15 TS 23.501, new values may be further added in later releases)).

When non-standardized 5QI or 'not pre-configured 5QI' is assigned to the QoS flow, it may be determined that the resource type of this QoS flow is delay critical GBR if delay critical information included in an IE called dynamic 5QI descriptor described in Tables 6 and 7 is configured to "delay critical."

As a fifth example, the NG-RAN may consider the delay time between N3 UPF and N6 UPF as 0 ms for all QoS flows of the UE according to the context information of the UE provided from the CN (which may be provided by the AMF based on subscriber information). The context information of the UE may include various kinds of information such as information indicating that the delay time between N3 UPF and N6 UPF is 0 ms to provide a service to the UE, information indicating that the UE uses URLLC, or information indicating that the UE uses edge computing.

As a sixth example, the delay time between N3 UPF and N6 UPF is always considered as 0 ms.

That is, the NG-RAN considers the delay time between N3 UPF and N6 UPF as 0 ms for all QoS flows of the UE.

Considering the delay time between N3 UPF and N6 UPF as 0 ms in the second to sixth methods above requires traffic transmission to be performed with low latency due to the characteristics of URLLC. Accordingly, the network may be configured to have little delay by configuring N3 UPF to play the role of N6 UPF (PSA role) and/or arranging N3 UPF and N6 UPF close to each other. Of course, the network may be configured in various other forms to support URLLC.

In the second to sixth methods, the delay time between N3 UPF and N6 UPF may be considered as a value greater than 0 (e.g., 0.1 ms, 0.2 ms, etc.) instead of 0 ms.

When N3 UPF and N6 UPF are present, NG-RAN may determine the PDB between NG-RAN and N3 UPF through the description related to FIG. 9, and determine the delay time between N3 UPF and N6 UPF using various methods of determining the PDB between N3 UPF and N6 UPF, and calculate the PDB of the CN section. Then, the end-to-end PDB may be calculated by measuring the PDB of the AN section and adding the PDB of the CN section thereto.

In the above operations, adding/modifying a PDU session in the NG-RAN may be construed as an operation of adding/modifying a PDU session including one or more QoS flows.

In the above descriptions, the method of determining the delay time of the core network section in order to efficiently support URLLC in the 5G system (5G mobile communication system, next-generation mobile communication system, 5GS) includes one or more of the operations/configurations/steps described above. The present disclosure may be applied not only for URLLC but also for other services.

The method of efficiently supporting network connection through the 3GPP 5G System (5G mobile communication system, next-generation mobile communication system) proposed in the present disclosure may be used for various services, and is particularly useful for a V2X service. However, it is not necessary to limit the method to the V2X service. In the present disclosure, V2X service, V2X application, V2X message, V2X traffic, V2X data, and the like are interchangeably used. Regarding the V2X service, the UE may include various kinds of UEs such as a pedestrian UE and a vehicle UE.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
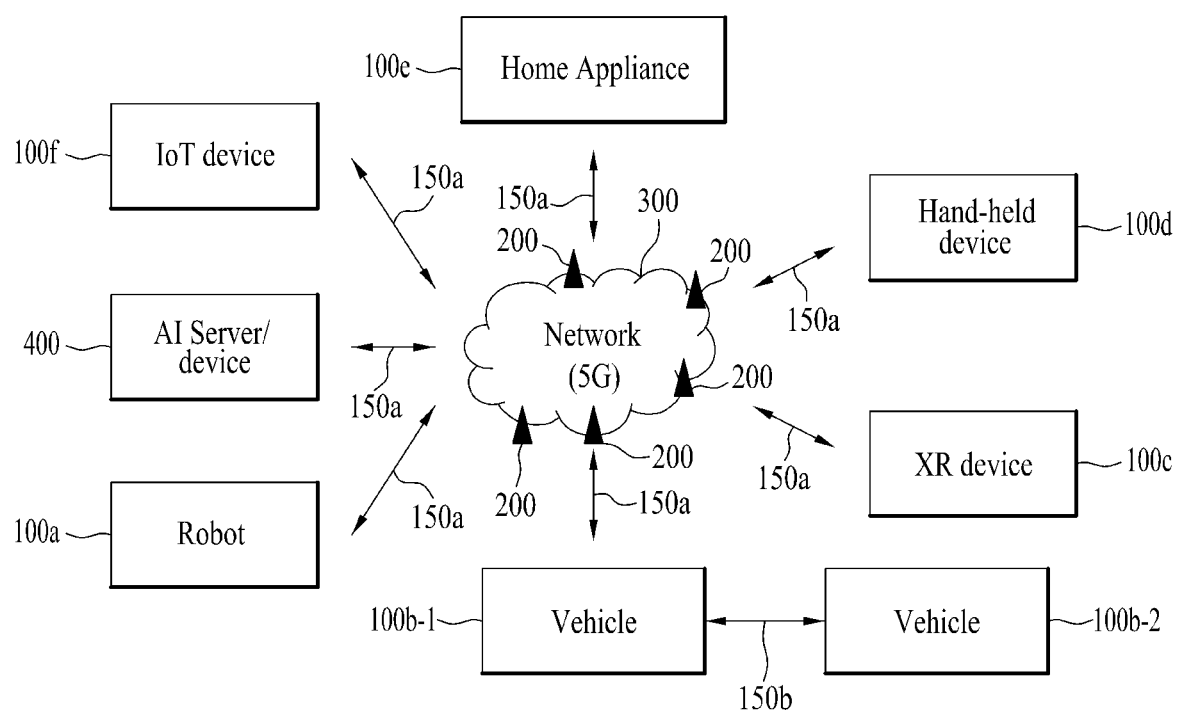
FIG. 13 illustrates a communication system applied to the present disclosure.

FIG. 13 illustrates a communication system 1 applied to the present disclosure.

Referring to FIG. 13, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of wireless devices applicable to the present disclosure

Figure 14:
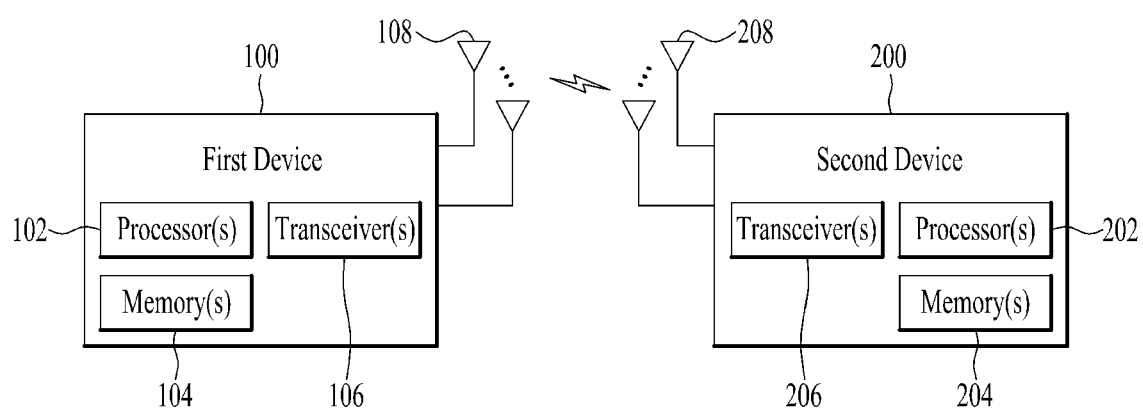
FIG. 14 shows an example of wireless devices applicable to the present disclosure.

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Signal Process Circuit Applicable to the Present Disclosure

Figure 15:
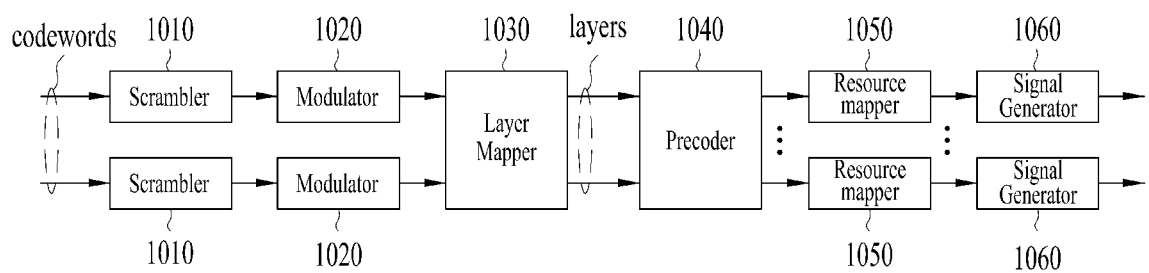
FIG. 15 illustrates a signal processing circuit for transmission signal.

FIG. 15 illustrates a signal process circuit for a transmission signal.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include IFFT modules, CP inserters, digital-to-analog converters (DACs), and frequency up-converters.

Signal processing procedures for a signal received in the wireless device may be configured in a reverse manner of the signal processing procedures 1010 to 1060 of FIG. 15. For example, the wireless devices (e.g., 100 and 200 of FIG. 14) may receive radio signals from the exterior through the antenna ports/transceivers. The received radio signals may be converted into baseband signals through signal restorers.

Figure 16:
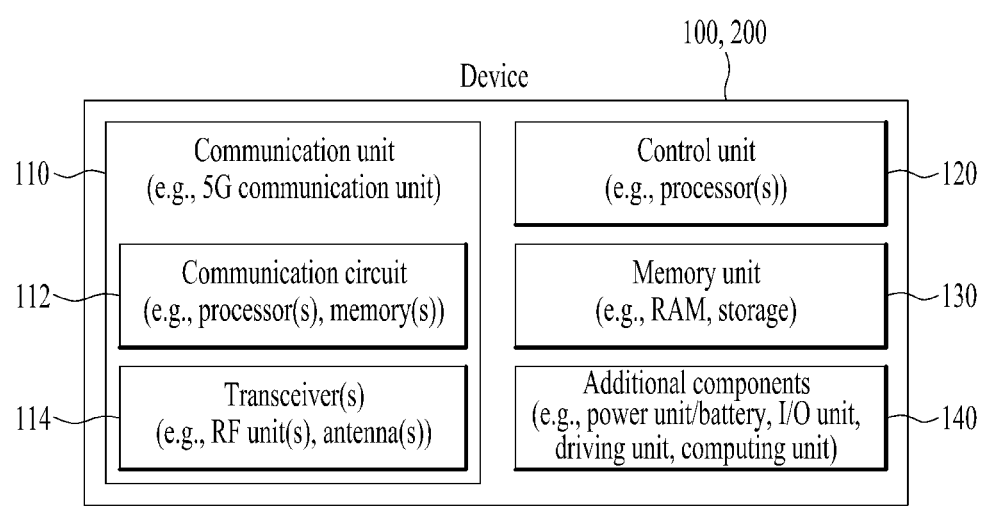
FIG. 16 shows another example of wireless devices applied to the present disclosure.

To this end, the signal restorers may include frequency DL converters, analog-to-digital converters (ADCs), CP remover, and FFT modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders. Examples of application of wireless device applicable to the present disclosure FIG. 16 illustrates another example of a wireless device applied to the present disclosure. The wireless device may be implemented in various forms according to a use-case/service (refer to FIG. 13).

Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a FinTech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 17:
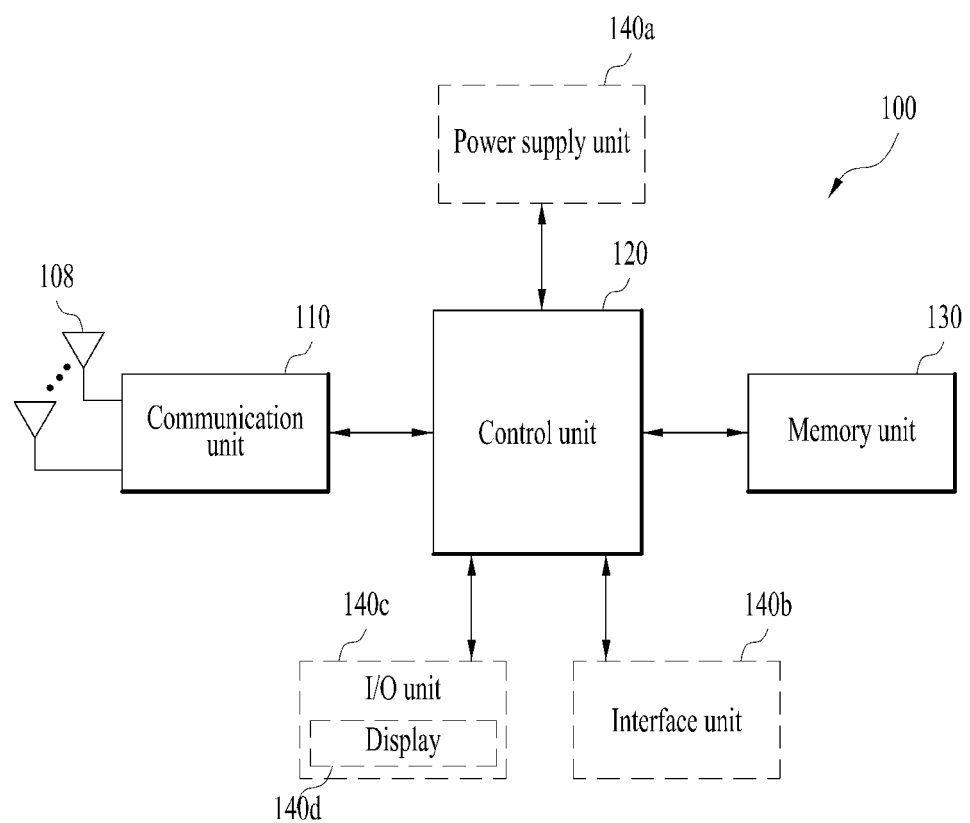
FIG. 17 illustrates a portable device to which the present disclosure is applied.

Hereinafter, an example of implementing FIG. 16 will be described in detail with reference to the drawings.
Examples of a Hand-Held Device Applicable to the Present Disclosure FIG. 17 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 17, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an application processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 18:
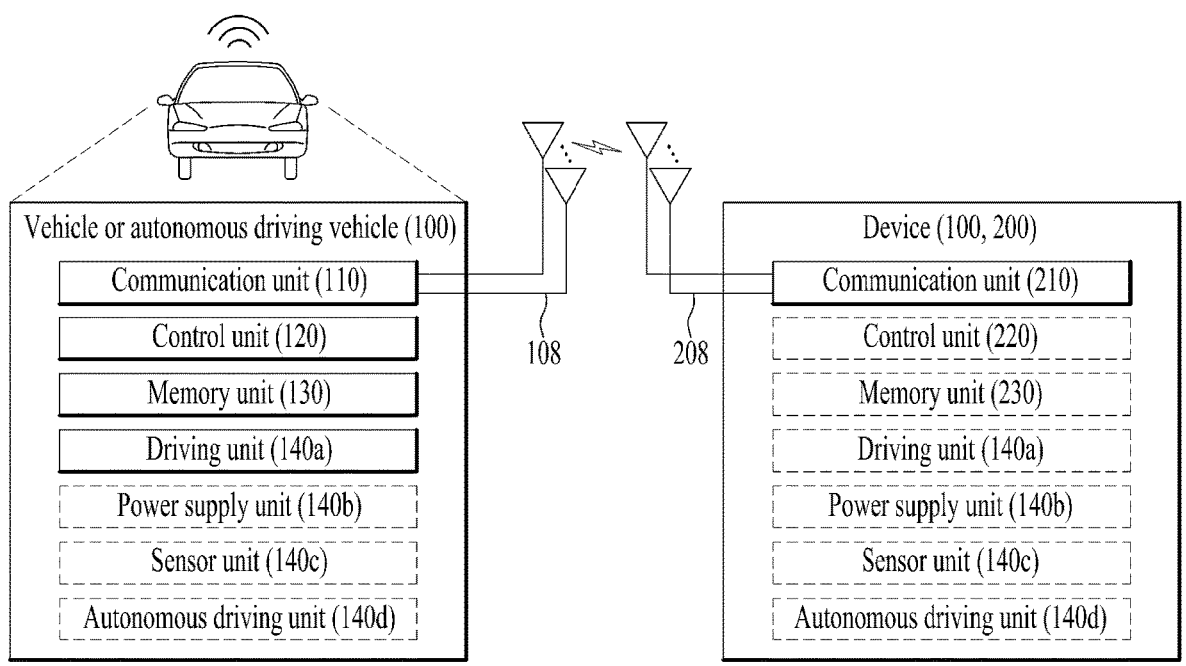
FIG. 18 illustrates a vehicle or autonomous driving vehicle to which the present disclosure is applied.

Examples of a Vehicle or an Autonomous Driving Vehicle Applicable to the Present Disclosure FIG. 18 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 18, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is configured, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 19:
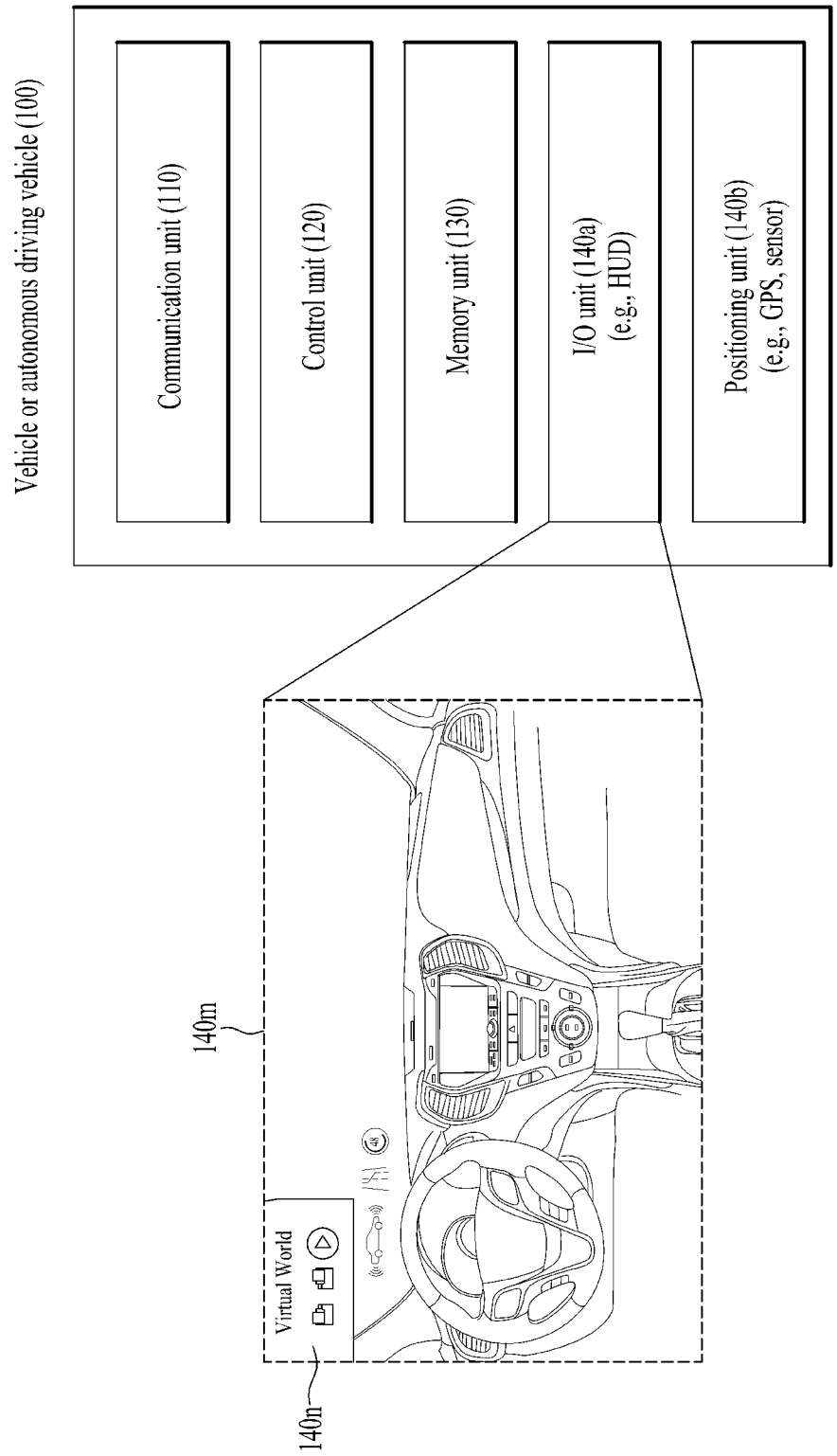
FIG. 19 illustrates a vehicle to which the present disclosure is applied.

FIG. 19 illustrates a vehicle applied to the present disclosure. The vehicle may be implemented as a transport means, an aerial vehicle, a ship, etc.

Referring to FIG. 19, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 16.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 20:
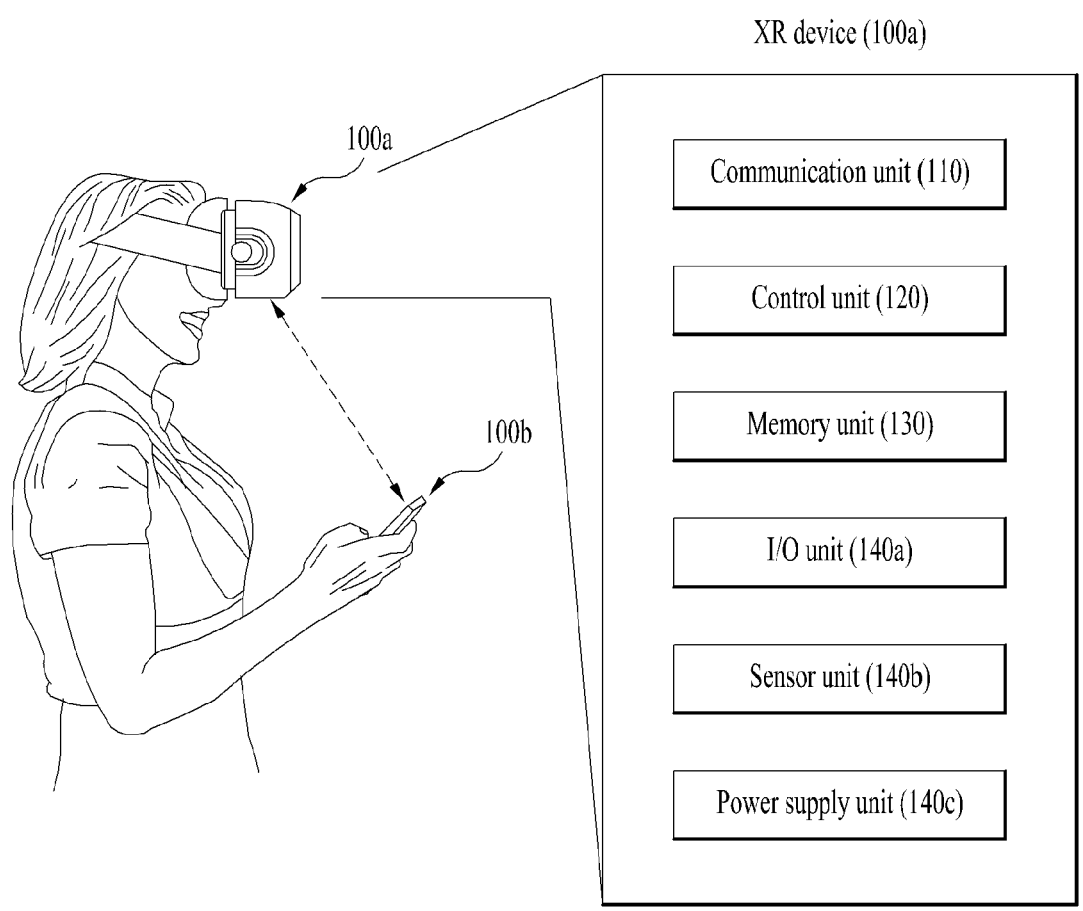
FIG. 20 illustrates an XR device to which the present disclosure is applied.

FIG. 20 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 20, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 16, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Examples of a Robot Applicable to the Present Disclosure

Figure 21:
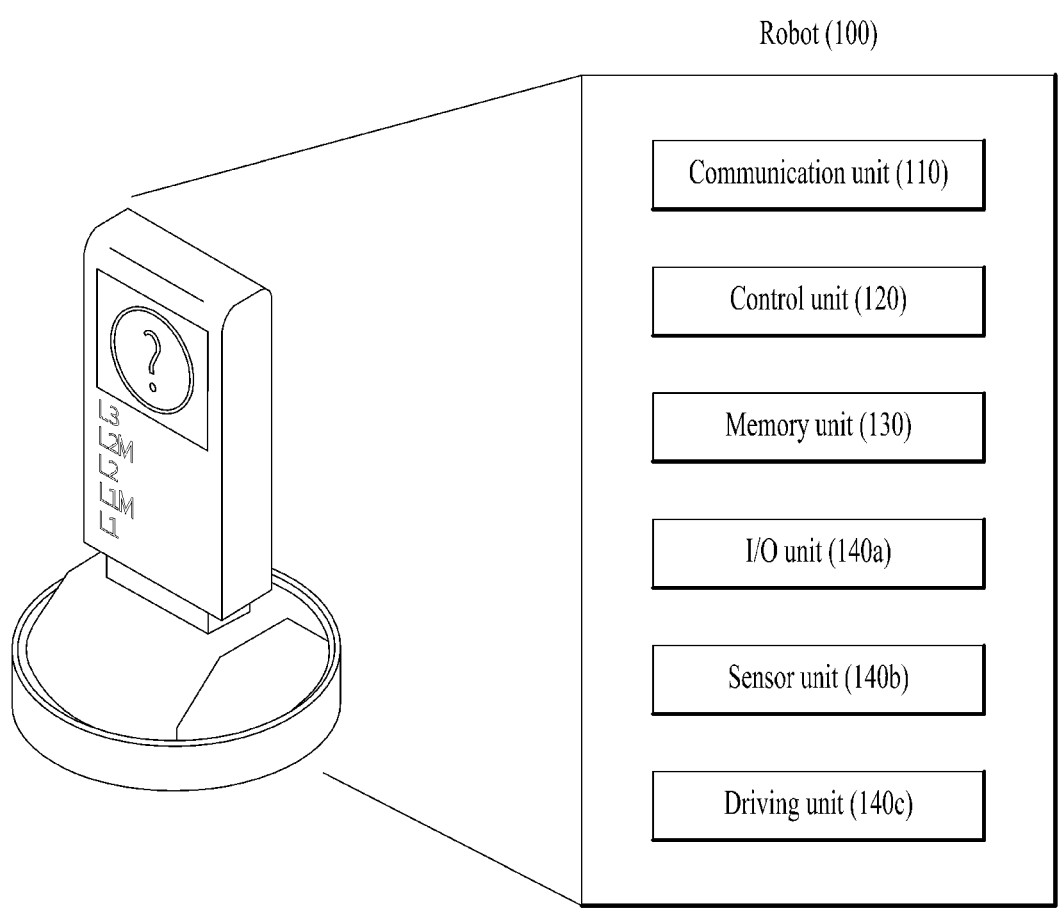
FIG. 21 illustrates a robot to which the present disclosure is applied.

FIG. 21 illustrates a robot applied to the present disclosure. The robot may be categorized into an industrial robot, a medical robot, a household robot, a military robot, etc., according to a used purpose or field.

Referring to FIG. 21, a robot 100 may include a communication unit 110, a control unit 120, a memory unit 130, an I/O unit 140*a*, a sensor unit 140*b*, and a driving unit 140*c*. Herein, the blocks 110 to 130/140*a* to 140*c* correspond to the blocks 110 to 130/140 of FIG. 16, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Examples of an AI Device Applicable to the Present Disclosure

Figure 22:
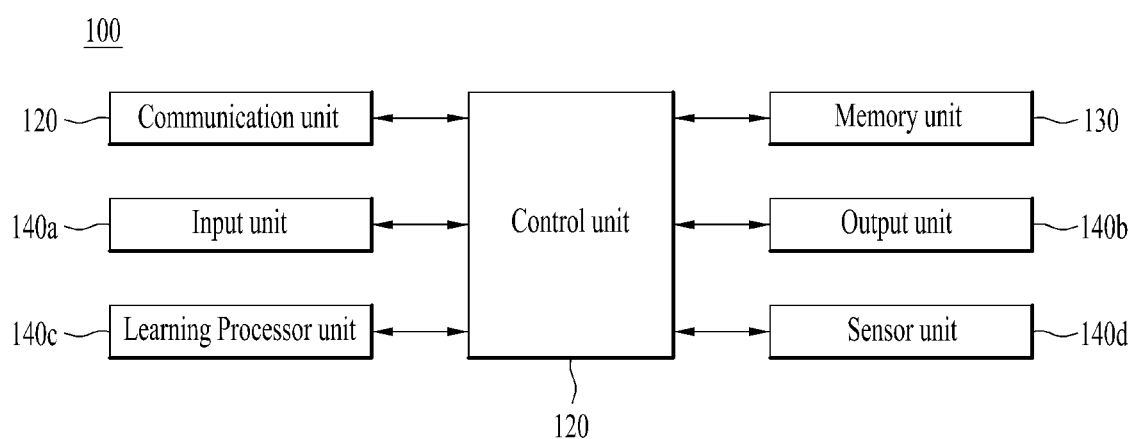
FIG. 22 illustrates an AI device to which the present disclosure is applied.

FIG. 22 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 22, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 16, respectively.

The communication unit 110 may transmit and receive wired/radio signals (e.g., sensor information, user input, learning models, or control signals) to and from external devices such as other AI devices (e.g., 100*x*, 200, or 400 of FIG. 13) or an AI server (e.g., 400 of FIG. 13) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140*c* or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140*c* or transmit the collected information to an external device such as an AI server (400 of FIG. 13). The collected history information may be used to update a learning model.

The memory unit 130 may store data for supporting various functions of the AI device 100. For example, the memory unit 130 may store data obtained from the input unit 140*a*, data obtained from the communication unit 110, output data of the learning processor unit 140*c*, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 13). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL APPLICABILITY

The above-described embodiments of the present disclosure are applicable to various mobile communication systems.

The invention claimed is:

1. A method for transmitting and receiving a signal by a next generation-radio access network (NG-RAN) in a wireless communication system, the method comprising:
receiving, by the NG-RAN, a user plane function (UPF)-related information including an internet protocol (IP) address of each UPF,
wherein the UPF-related information is received from a session management function (SMF); and
based on a value of a first delay between the NG-RAN and the UPF, determining, by the NG-RAN, a value of a second delay between a user equipment (UE) and the NG-RAN,
wherein the value of the first delay is configured in the NG-RAN individually for the each UPF based on the IP address, and the UPF-related information does not include the value of the first delay.

2. The method of claim 1, wherein the value of the second delay is obtained by subtracting the value of the first delay from a packet delay budget (PDB) of a quality of service (QOS) flow.

3. The method of claim 1, wherein the each UPF corresponds to a UPF terminating N3.

4. The method of claim 1, wherein the NG-RAN performs an operation related to scheduling for the UE based on the value of the second delay.

5. The method of claim 1, wherein the UPF-related information is received through one of a protocol data unit (PDU) session establishment procedure, a PDU session modification procedure, or a service request procedure.

6. The method of claim 1, wherein the value of the first delay and the value of the second delay are upper limits allowing a specific packet to be delayed.

7. A next generation-radio access network (NG-RAN) device in a wireless communication system, comprising:
at least one processor; and
at least one memory operably coupled to the at least one processor,
wherein the at least one processor is configured to:
receive user plane function (UPF)-related information including an internet protocol (IP) address of each UPF,
wherein the UPF-related information is received from a session management function (SMF); and
determine, based on a value of a first delay between the NG-RAN and the UPF, a value of a second delay between a user equipment (UE) and the NG-RAN,
wherein the value of the first delay is configured individually in at least one memory for the each UPF based on the IP address, and the UPF-related information does not include the value of the first delay.

8. The device of claim 7, wherein the value of the second delay is obtained by subtracting the value of the first delay from a packet delay budget (PDB) of a quality of service (QOS) flow.

9. The device of claim 7, wherein the each UPF corresponds to a UPF terminating N3.

10. The device of claim 7, wherein the NG-RAN performs an operation related to scheduling for the UE based on the value of the second delay.

11. The device of claim 7, wherein the UPF-related information is received through one of a protocol data unit (PDU) session establishment procedure, a PDU session modification procedure, or a service request procedure.

* * * * *